(12) United States Patent
Driscoll et al.

(10) Patent No.: US 9,322,908 B2
(45) Date of Patent: Apr. 26, 2016

(54) SYSTEMS AND METHODS FOR CONCEALED RADAR IMAGING

(71) Applicant: Elwha LLC, Bellevue, WA (US)

(72) Inventors: Tom Driscoll, San Diego, CA (US); Roderick A. Hyde, Redmond, WA (US); Jordin T. Kare, Seattle, WA (US); David R. Smith, Durham, NC (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 193 days.

(21) Appl. No.: 14/139,659

(22) Filed: Dec. 23, 2013

(65) Prior Publication Data

US 2015/0177374 A1 Jun. 25, 2015

(51) Int. Cl.
| | | |
|---|---|---|
| *G01S 13/86* | (2006.01) | |
| *G01S 13/88* | (2006.01) | |
| *H01Q 1/22* | (2006.01) | |
| *H01Q 1/42* | (2006.01) | |
| *G01S 13/89* | (2006.01) | |
| *G01S 7/02* | (2006.01) | |
| *H01Q 3/02* | (2006.01) | |
| *H01Q 3/26* | (2006.01) | |

(52) U.S. Cl.
CPC . *G01S 13/86* (2013.01); *G01S 7/02* (2013.01); *G01S 13/867* (2013.01); *G01S 13/89* (2013.01); *H01Q 1/22* (2013.01); *H01Q 1/42* (2013.01); *H01Q 1/425* (2013.01); *H01Q 3/02* (2013.01); *H01Q 3/26* (2013.01); *G01S 13/887* (2013.01); *G01S 2007/027* (2013.01)

(58) Field of Classification Search
CPC ............ G01S 13/86–13/867; G01S 13/887; G01S 13/888; H01Q 1/22; H01Q 1/42; H01Q 1/425; H01Q 3/02; H01Q 3/26

USPC .......................................................... 342/22
See application file for complete search history.

(56) References Cited

U.S. PATENT DOCUMENTS

| | | | | | |
|---|---|---|---|---|---|
| 5,016,035 | A | * | 5/1991 | Myles, Jr. ............... | G03B 17/53 396/2 |
| 5,355,284 | A | * | 10/1994 | Roberts ................ | B60Q 1/2665 359/839 |
| 5,573,012 | A | * | 11/1996 | McEwan ................ | A61B 5/024 600/428 |
| 5,682,168 | A | | 10/1997 | James et al. | |
| 5,724,187 | A | * | 3/1998 | Varaprasad ............. | B32B 17/06 359/265 |
| 5,774,091 | A | * | 6/1998 | McEwan .................. | G01C 3/08 342/126 |
| 6,054,961 | A | * | 4/2000 | Gong ................... | H01Q 1/1271 343/713 |

(Continued)

OTHER PUBLICATIONS

PCT International Search Report; International App. No. PCT/US2014/069828; Mar. 5, 2014; pp. 1-7.

*Primary Examiner* — Peter Bythrow
(74) *Attorney, Agent, or Firm* — Foley & Lardner LLP

(57) ABSTRACT

A concealed radar imaging system includes a visible light mirror, a radar device positioned behind the visible light mirror, and a processing circuit coupled to the radar device. The visible light mirror includes a reflective layer configured to reflect visible light, and allow a radar signal to pass therethrough. The radar device is configured to transmit the radar signal, receive a reflection of the radar signal, and generate reflection data based on the reflected radar signal. The processing circuit is configured to control operation of the radar device, receive the reflection data from the radar device, and generate imaging data based on the transmitted radar signal and the reflection data.

16 Claims, 9 Drawing Sheets

(56) References Cited

U.S. PATENT DOCUMENTS

| | | | |
|---|---|---|---|
| 6,259,475 B1* | 7/2001 | Ramachandran | H04N 7/18 348/117 |
| 6,466,125 B1* | 10/2002 | Richards | G01S 13/42 340/573.1 |
| 6,492,906 B1* | 12/2002 | Richards | G01S 13/42 340/573.1 |
| 6,739,028 B2* | 5/2004 | Sievenpiper | H01Q 15/14 205/118 |
| 6,790,526 B2 | 9/2004 | Vargo et al. | |
| 6,900,769 B2* | 5/2005 | Schlieber | H01Q 1/3291 343/713 |
| 6,954,152 B1* | 10/2005 | Matthews | B60R 1/00 340/426.15 |
| 7,134,130 B1* | 11/2006 | Thomas | H04N 7/163 348/E7.061 |
| 7,198,341 B1 | 4/2007 | Rast | |
| 7,260,823 B2* | 8/2007 | Schlack | G06Q 30/02 348/E7.071 |
| 7,272,431 B2* | 9/2007 | McGrath | A61B 5/024 600/509 |
| 7,301,493 B1* | 11/2007 | Canales | H01Q 15/006 342/1 |
| 7,345,618 B1* | 3/2008 | Cole | G01S 13/32 342/22 |
| 7,548,803 B2* | 6/2009 | MacCarthy | B60R 1/12 307/10.5 |
| 7,818,763 B2* | 10/2010 | Sie | G06Q 30/02 386/249 |
| 7,973,734 B2 | 7/2011 | Strempel et al. | |
| 8,013,780 B2 | 9/2011 | Lynam | |
| 8,035,545 B2 | 10/2011 | Pruett et al. | |
| 8,077,071 B2 | 12/2011 | Cincotti et al. | |
| 8,098,293 B2* | 1/2012 | Nakanishi | G06K 9/00228 348/222.1 |
| 8,115,624 B2* | 2/2012 | Dayton | G07C 3/00 340/539.14 |
| 8,217,830 B2 | 7/2012 | Lynam | |
| 8,294,608 B1 | 10/2012 | Lynam | |
| 8,311,616 B2* | 11/2012 | Feldman | A61B 5/04005 600/430 |
| 8,482,158 B2 | 7/2013 | Kurs et al. | |
| 8,604,932 B2* | 12/2013 | Breed | B60J 10/00 180/271 |
| 8,604,968 B2* | 12/2013 | Alland | B60R 1/00 342/22 |
| 8,738,024 B1* | 5/2014 | Kerr | G01S 5/0252 342/458 |
| 8,836,580 B2* | 9/2014 | Mendelson | G01C 21/206 342/450 |
| 8,841,618 B2* | 9/2014 | Jeck | G01S 7/04 250/339.06 |
| 8,907,861 B2* | 12/2014 | Hirt | H01Q 1/42 343/702 |
| 8,970,429 B2* | 3/2015 | Pickle | G01S 13/726 342/159 |
| 9,019,149 B2* | 4/2015 | Bangera | G06Q 30/02 342/176 |
| 9,022,586 B2* | 5/2015 | Englander | B60R 1/083 348/151 |
| 9,063,232 B2* | 6/2015 | McNeill | G01S 7/35 |
| 2002/0024713 A1 | 2/2002 | Roberts et al. | |
| 2003/0152766 A1 | 8/2003 | Vargo et al. | |
| 2003/0193613 A1* | 10/2003 | Matko | B60R 1/00 348/375 |
| 2004/0252993 A1* | 12/2004 | Sato | G03B 19/02 396/661 |
| 2006/0061504 A1* | 3/2006 | Leach, Jr. | G01S 7/41 342/22 |
| 2007/0140095 A1 | 6/2007 | Rast | |
| 2007/0211922 A1 | 9/2007 | Crowley et al. | |
| 2008/0100939 A1* | 5/2008 | Brester | B60R 1/0605 359/872 |
| 2008/0238692 A1* | 10/2008 | Dayton | G07C 3/00 340/573.1 |
| 2008/0270172 A1* | 10/2008 | Luff | G06Q 30/02 705/1.1 |
| 2008/0278408 A1 | 11/2008 | Strickland et al. | |
| 2009/0025024 A1* | 1/2009 | Beser | G06Q 30/0273 725/12 |
| 2009/0052859 A1* | 2/2009 | Greenberger | H04N 9/87 386/213 |
| 2009/0138805 A1* | 5/2009 | Hildreth | G06K 9/00335 715/745 |
| 2009/0164287 A1* | 6/2009 | Kies | G06Q 30/0277 705/1.1 |
| 2009/0296997 A1* | 12/2009 | Rocheford | G06F 21/35 382/124 |
| 2010/0079883 A1* | 4/2010 | Englander | B60R 1/083 359/877 |
| 2010/0188315 A1 | 7/2010 | Baik et al. | |
| 2010/0288116 A1 | 11/2010 | Cincotti et al. | |
| 2011/0166940 A1 | 7/2011 | Bangera et al. | |
| 2012/0154196 A1 | 6/2012 | Cincotti et al. | |
| 2012/0268311 A1 | 10/2012 | Lynam | |
| 2013/0044021 A1 | 2/2013 | Lynam | |
| 2013/0075613 A1 | 3/2013 | Dinh et al. | |
| 2013/0126738 A1 | 5/2013 | Jeck | |

* cited by examiner

SYSTEMS AND METHODS FOR CONCEALED RADAR IMAGING

BACKGROUND

In general, radar systems utilize radiofrequency signals to detect the presence of objects. For example, the position and motion (e.g., speed and direction) of objects can be determined. Typically, a radiofrequency signal pulse is transmitted, and then reflected (backscattered) portions of the signal are analyzed to ascertain information related to the objects. Additional analysis and signal processing techniques may also be applied to extrapolate an image based on the reflected signal.

SUMMARY

One embodiment relates to a concealed radar imaging system, including a visible light mirror, a radar device positioned behind the visible light mirror, and a processing circuit coupled to the radar device. The visible light mirror includes a reflective layer configured to reflect visible light, and allow a radar signal to pass therethrough. The radar device is configured to transmit the radar signal, receive a reflection of the radar signal, and generate reflection data based on the reflected radar signal. The processing circuit is configured to control operation of the radar device, receive the reflection data from the radar device, and generate imaging data based on the transmitted radar signal and the reflection data.

Another embodiment relates to a method of concealed radar imaging. The method includes transmitting, by a radar device, a radar signal through a visible light mirror comprising a reflective layer, receiving a reflection of the radar signal, generating reflection data based on the reflected radar signal, and generating imaging data based on the transmitted radar signal and the reflection data. The radar device is positioned behind the reflective layer, and the reflective layer is configured to reflect visible light, and allow a radar signal to pass therethrough.

Another embodiment relates to a concealed radar imaging system, including an OLED display comprising an electroluminescent layer of an organic compound, a radar device positioned behind the OLED display, and a processing circuit coupled to the radar device. The electroluminescent layer is configured to emit light to display an image, and allow a radar signal to pass therethrough. The panel radar device is configured to transmit the radar signal, receive a reflection of the radar signal, and generate reflection data based on the reflected radar signal. The processing circuit is configured to control operation of the radar device, receive the reflection data from the radar device, and generate imaging data based on the transmitted radar signal and the reflection data.

Another embodiment relates to a method of concealed radar imaging. The method includes transmitting, by a radar device, a radar signal through an OLED display comprising an electroluminescent layer of an organic compound, where the radar device is positioned behind the OLED display, and where the electroluminescent layer is configured to: emit light to display an image, and allow a radar signal to pass therethrough. The method further includes receiving a reflection of the radar signal, generating reflection data based on the reflected radar signal, and generating imaging data based on the transmitted radar signal and the reflection data.

Another embodiment relates to a concealed radar imaging system, including a picture display, a flat panel radar device positioned behind the static picture display, and a processing circuit coupled to the radar device. The picture display is configured to display a static image, and allow a radar signal to pass therethrough. The radar device is configured to transmit the radar signal, receive a reflection of the radar signal, and generate reflection data based on the reflected radar signal. The processing circuit is configured to control operation of the radar device, receive the reflection data from the radar device, and generate imaging data based on the transmitted radar signal and the reflection data.

Another embodiment relates to a method of concealed radar imaging. The method includes transmitting, by a flat panel radar device, a radar signal through a static picture display, where the radar device is positioned behind the static picture display, and where the picture display is configured to: display a static image and allow a radar signal to pass therethrough. The method further includes receiving a reflection of the radar signal, generating reflection data based on the reflected radar signal, and generating imaging data based on the transmitted radar signal and the reflection data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
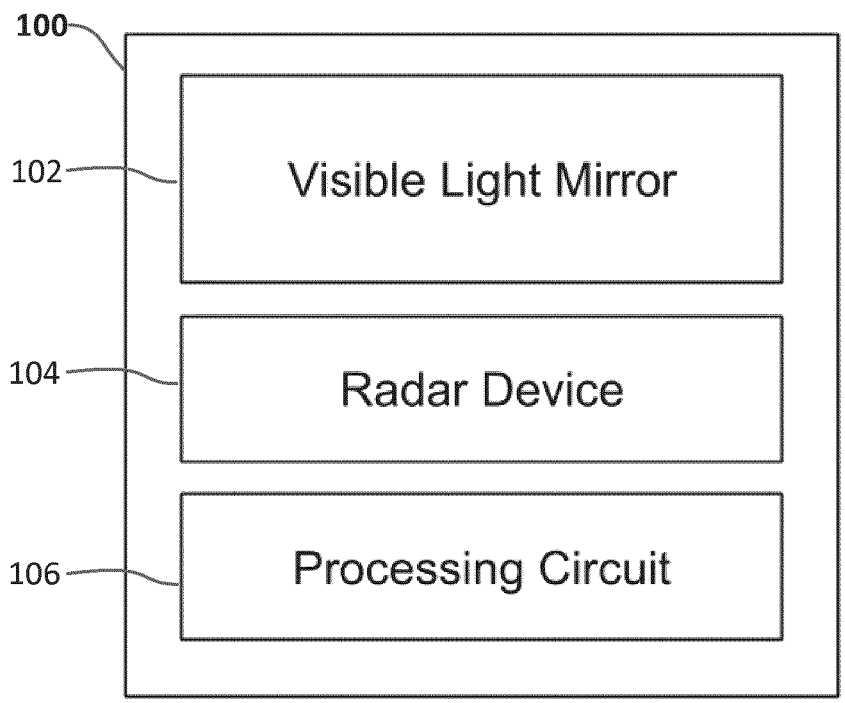
FIG. 1 is a block diagram of a system for concealed radar imaging according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented here.

Referring generally to the figures, various embodiments of systems and methods for concealed radar imaging are shown and described. In many public places (e.g., an airport, a train station, a subway, a shopping mall, a city street, etc.) signage space is valuable for advertising. In such places, it may be desirable to include radar imaging/scanning devices for security purposes. Because signage space (e.g., wall space, etc.) is often limited, there is a tradeoff that exists between installing advertising fixtures vs. radar imaging systems. In other words, the installation of a radar imaging system may cost the loss of revenue that could otherwise be gained if an advertisement were installed in the same location. In accordance with a number of the embodiments described herein, a radar imaging system is concealed (i.e., camouflaged) and placed behind advertisements and other objects (e.g., mirrors, active video displays, etc.). In this manner, the radar imaging system can be hidden from a viewer. Also, the nature of the object concealing the radar (e.g., advertisement, mirror, display) may be taken advantage of to capture gaze of a viewer. This allows a viewer to be imaged at a face-on (or semi face-on) perspective as the viewer looks at the object. Radar signals generated by the radar imaging system pass through the object with little to no interference caused by the object. Various radar devices may be utilized to implement the inventions described herein. The radar device may include transmitters, receivers, and/or reflectors. The radar devices described herein may be configured to transmit millimeter wave signals, and the configuration of the object in front of a radar device may be adjusted to minimize interference of radar signals passing therethrough, as will be discussed further herein.

Referring to FIG. 1, a block diagram of system 100 for concealed radar imaging is shown. According to one embodiment, system 100 includes visible light mirror 102, radar device 104, and processing circuit 106. Visible light mirror 102 includes a reflective layer configured to reflect visible light. In one embodiment, visible light mirror 102 includes a continuous-film metallic reflective layer. For example, visible light mirror 102 may include a silver-based film layer. As another example, visible light mirror 102 may include an aluminum-based film layer. The thickness of the reflective layer is selected such that visible light is reflected, and radar signals pass therethrough with minimal interference. The thickness of the reflective layer may be based on the particular wavelength of radar signals being utilized. The thickness of the reflective layer is generally less than the skin depth (for the radar frequency and the conductivity of the reflective layer) of the radar signal being used by radar device 104. In another embodiment, visible light mirror 102 includes a reflector that is formed from an array of disconnected metallic areas attached to a backing layer that allows radar signals to pass therethrough (e.g., glass, plastic, acrylic glass, etc.). The spacing between the metallic areas may be selected such that the gaps between the areas are difficult to resolve by a viewer (e.g., subtend less than about 0.1 milliradian of arc), yet the gaps are large enough to allow a radar signal generated by radar device 104 to pass therethrough. The spacing selected for a certain embodiment may be based on the expected average distance of a viewer. For example, in an embodiment where a viewer is expected to be no closer than 10 meters from visible light mirror 102, a larger spacing may be implemented as compared to an embodiment where a viewer is expected to be within 3 meters of visible light mirror 102.

Radar device 104 includes all components necessary to transmit and receive a radar signal. For example, radar device may include one or more antennas, pulse generators, analog to digital convertors, filters, transmitters, receivers, reflectors, etc. Radar device 104 is generally arranged behind visible light mirror 102 such that it is obstructed from the view of a viewer. Alternatively, radar device 104 may be embedded or otherwise integrated into a frame or structure of visible light mirror 102. In one embodiment, radar device 104 includes a non-moving flat panel radar antenna. For example, the flat panel radar antenna may be a phased array antenna device. As another example, the flat panel radar antenna may be an MSAT (metamaterial surface antenna technology) radar device. In another embodiment, radar device 104 includes a physically moving radar device. For example, radar device 104 may include a dish, a parabolic antenna, an "orange-peel" antenna, or other type of movable radar antenna. The antenna may be configured to rotate 360 degrees, or to oscillate a certain amount. Further, the antenna may be configured to tilt and pan in any direction. Radar signals from radar device 104 pass through visible light mirror 102, and reflections of the radar signal are received by radar device 104. Operation of radar device 104 may be controlled by processing circuit 106, and the sent and received radar signals may be analyzed by processing circuit 106. Processing circuit 106 is generally configured to generate the signals necessary to interface with the components of radar device 104. Processing circuit 106 may cause radar device 104 to transmit a certain radar signal or signal pattern, and processing circuit 106 may analyze received reflections of the radar signal to form imaging data based on the signal.

Figure 2:
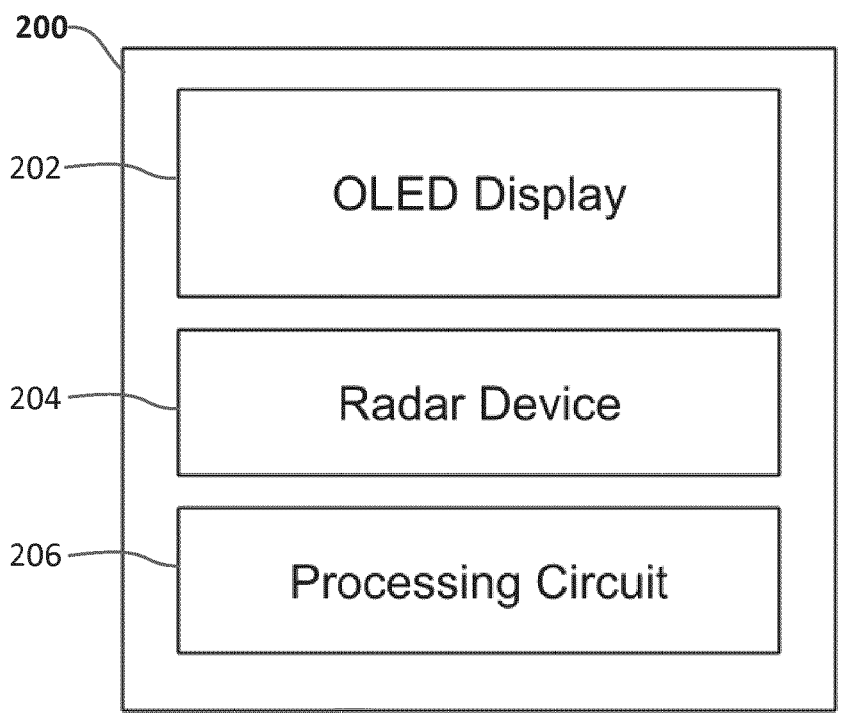
FIG. 2 is a block diagram of a system for concealed radar imaging according to one embodiment.

Referring to FIG. 2, a block diagram of system 200 for concealed radar imaging is shown. According to one embodiment, system 200 includes organic light-emitting diode (OLED) display 202, radar device 204, and processing circuit 206. OLED display 202 generally includes a plurality of OLED devices that are formed from an organic compound, which are arranged to form an electroluminescent layer (i.e., the screen of the display). OLED display 202 may emit light via the electroluminescent layer to display an image. An electric current may be applied to the electroluminescent layer to cause the electroluminescent layer to emit light. As an example, OLED display 202 may be an OLED television or a computer monitor. In one embodiment, OLED display 202 is configured to display a static image or to display a plurality of images forming a video image sequence. In one embodiment, OLED display 202 is configured to display a static or dynamic advertisement. In another embodiment, OLED display 202 is configured to display a television program. In another embodiment, OLED display 202 is configured to display a map corresponding to the location of OLED display 202 (e.g., an airport terminal map, a train station map, a shopping mall directory, etc.). System 200 may include additional sensors (e.g., proximity sensors, eye detection devices, etc.) and processing circuitry configured to detect an onlooking viewer. In some embodiments, processing circuit 206 may be configured to detect an onlooking viewer from the radar imaging data. In this manner, images displayed by OLED display 202 may also be reactive to a viewer, and various advertisements or other images may be displayed upon detecting the viewer. Radar device 204 includes all components necessary to transmit and receive a radar signal, and may be a flat panel or moving radar device. Radar device 204 is generally positioned behind OLED display 202 (e.g., behind the electroluminescent layer) such that it is obstructed from view from a viewer. Alternatively, radar device 204 may be embedded or otherwise integrated into a frame or structure of OLED display 202. For example, radar device 204 may also be incorporated into a bezel or rear panel of OLED display 202. Radar signals from radar device 204 may pass through OLED display 202, and reflections of the radar signal are received by radar device 204. Operation of radar device 204 may be controlled by processing circuit 206, and the sent and received radar signals may be analyzed by processing circuit 206. Processing circuit 206 is generally configured to generate the signals necessary to interface with the components of radar device 204. Processing circuit 206 may cause radar device 204 to transmit a radar signal, and processing circuit 206 may form imaging data based on reflections of the transmitted signal.

Figure 3:
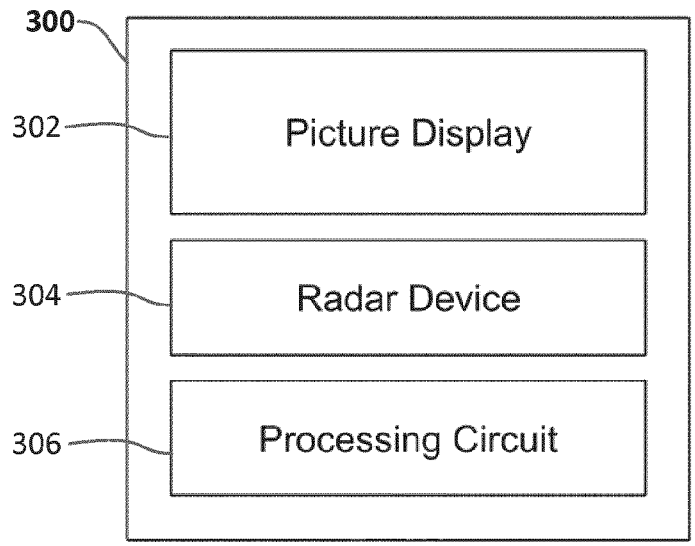
FIG. 3 is a block diagram of a system for concealed radar imaging according to one embodiment.

Referring to FIG. 3, a block diagram of system 300 for concealed radar imaging is shown. According to one embodiment, system 300 includes picture display 302, flat panel radar device 304, and processing circuit 306. Picture display 302 is generally configured to display a static image. For example, picture display 302 may be a billboard, a sign, a poster, a painting, and the like, that displays an image of an advertisement, a map, a directory, etc. The image displayed by picture display 302 may be printed or formed using an ink/medium configured to allow radar transmissions to pass therethrough with minimal absorption. The image displayed by picture display 302 may be based on the location of picture display 302 (e.g., an airport map, a shopping mall directory, etc.). Metallic ink may also be used where the depth of the metallic ink layer is of a thickness configured to allow the transmission of radar signals (e.g., millimeter wavelength signals) to pass therethrough. Flat panel radar device 304 includes all components necessary to transmit and receive a radar signal. Flat panel radar device 304 is generally positioned behind picture display 302 such that it is obstructed from view from a viewer. Alternatively, flat panel radar device 304 may be embedded or otherwise integrated into a frame or structure of picture display 302. Radar signals from flat panel radar device 304 may pass through picture display 302, and reflections of the radar signal are received by flat panel radar device 304. Operation of flat panel radar device 304 may be controlled by processing circuit 306, and the sent and received radar signals may be analyzed by processing circuit 306. Processing circuit 306 is generally configured to generate the signals necessary to interface with the components of flat panel radar device 304. Processing circuit 306 may cause flat panel radar device 304 to transmit a radar signal, and processing circuit 306 may form imaging data based on reflections of the transmitted signal.

Figure 4:
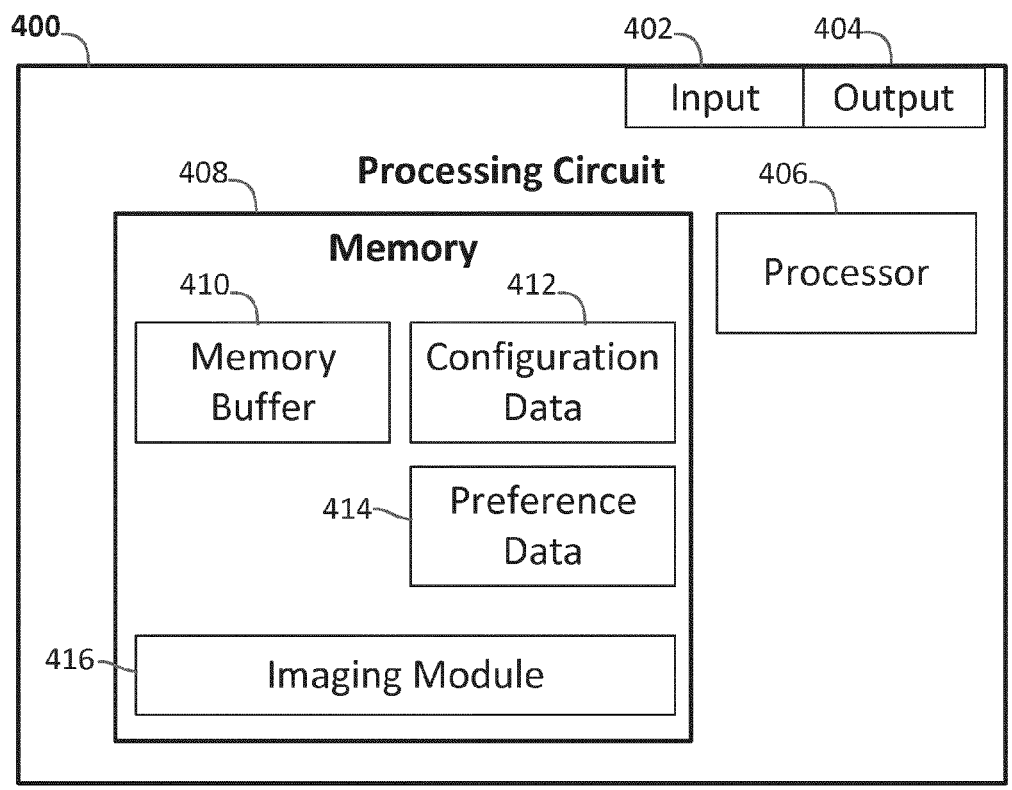
FIG. 4 is a block diagram of a processing circuit according to one embodiment.

Referring to FIG. 4, a block diagram of processing circuit 400 for completing the systems and methods of the present disclosure is shown according to one embodiment. Processing circuit 400 is generally configured to communicate with a radar device (e.g., radar devices 104, 204, and 304). Processing circuit 400 can analyze backscattered radar signals received by the radar device to generate imaging data (e.g., based on angle, position, strength, attenuation, noise, timing, range information, etc.). The imaging data may include any data received or generated based on the transmitted and backscattered radar signals. In one embodiment, the imaging data is a function of the angle, position, and/or the range information related to backscattered radar signals in any dimension(s). Processing circuit 400 may also generate images (e.g., two-dimensional and/or three-dimensional images, etc.) based on the imaging data. In one embodiment, processing circuit 400 utilizes computational imaging techniques in analyzing backscattered radar signals and generating the imaging data and images. Processing circuit 400 can also generate the signals necessary to control the radar device (e.g., to cause the radar device to emit a radar scanning signal, to cause a moveable radar device to rotate or pan, to enable/disable radar scanning, etc.). Processing circuit 400 may accept input data continuously or periodically. Processing circuit 400 may also base processing on preference or configuration data. In controlling the radar device and generating imaging data, processing circuit 400 may make use of imaging processing techniques and algorithms, machine learning, artificial intelligence, interactions with databases and database table lookups, pattern recognition and logging, intelligent control, neural networks, fuzzy logic, etc. Processing circuit 400 further includes input 402 and output 404. Input 402 is configured to receive a data stream (e.g., a digital or analog stream of data) and configuration information. Output 404 is configured to output data (e.g., imaging data, configuration data during a configuration process, etc.).

According to one embodiment, processing circuit 400 includes processor 406. Processor 406 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 400 also includes memory 408. Memory 408 may be one or more devices (e.g., RAM, ROM, Flash Memory, hard disk storage, etc.) for storing data and/or computer code for facilitating the various processes described herein. Memory 408 may be or may include non-transient volatile memory or non-volatile memory. Memory 408 may include database components, object code components, script components, or any other type of information structure for supporting the various activities and information structures described herein. Memory 408 may be communicably connected to processor 406 and provide computer code or instructions to processor 406 for executing the processes described herein (e.g., the processes shown in FIGS. 8-11). Memory 408 may include memory buffer 410. Memory buffer 410 may be configured to receive a data stream through input 402. For example, the data stream may include data related to radar signals that were generated or received by the radar device. The data received through input 402 may be stored in memory buffer 410 until memory buffer 410 is accessed for data by the various modules of memory 408. For example, imaging module 416 can access the data that is stored in memory buffer 410. Any data received through input 402 may also be immediately accessed.

Memory 408 further includes configuration data 412. Configuration data 412 includes data related to processing circuit 400. For example, configuration data 412 may include information related to interfacing with other components (e.g., components of a radar device, etc.). This may also include the command set needed to interface with a computer system used configure a system having processing circuit 400. Based on data stored in configuration data 412, processing circuit 400 may format data for output via output 404, which may include formatting data for transmission. For example, processing circuit 400 may generate imaging data based on received radar signals, and may format the imaging data (e.g., an image file) to be transmitted/exported. Processing circuit 400 may also format data for transmission and form images according to any protocols or standards as specified by configuration data 412. For example, processing circuit may form an image of a certain file type (e.g., .jpg, .raw, .tif, .png, .bmp, a proprietary format, etc.). Configuration data 412 may further include information as to how often input should be accepted from a radar device. Configuration data 412 may include default values required to initiate communication with any components of the system having processing circuit 400. Configuration data 412 further includes data to configure communication between the various components of processing circuit 400. Configuration data 412 further includes data related to various networking/communication protocols to allow an operator to access a device having processing circuit 400. For example, the device may be accessed via a Wi-Fi network, an Ethernet network, a USB connection, a serial port connection, etc. Memory 408 further includes preference data 414, which is configured to store various operator preferences and settings related to the systems described herein. For example, the described systems may be enabled or disabled by an operator as specified by preference data 414. As another example, the described systems may be configured to run according to a schedule stored in preference data 414 as provided by an operator.

Memory 408 further includes imaging module 416. Imaging module 416 is configured to receive data from a radar device (e.g., radar devices 104, 204, and 304) and to generate radar-imaging data based on the received data. Imaging module 416 may also cause the radar device to transmit a radar signal. Imaging module 416 can access configuration information, preference data, and other data as provided by processing circuit 400.

In one embodiment, imaging module 416 generates radar images based on data provided by a radar device. The data provided by the radar device is related to radiofrequency radar signals transmitted by the radar device, and reflections (e.g., backscatter) of the radar signals off of objects. An image may be generated based on the energy of the reflections received. In one embodiment, the radar images are generated using compressive imaging/sensing techniques, where an image is constructed based on multiple sampling signals. Imaging module 416 may cause the radar device to transmit a series of radiofrequency pulse signals (i.e. millimeter wave signals). The pulse signals may be of the same or differing frequencies, and the frequencies may depend on a level of resolution desired (e.g., as specified in configuration data 412, etc.). Based on the radiofrequency energy that is reflected back from the pulse signals, an image can be constructed. For example, in one embodiment, a linear projection can be used to acquire a representation of a compressed signal based on measurements of the reflected pulse signals. An image may then be formed by reconstructing the compressed signal (e.g., via a linear or greedy pursuit algorithm, etc.). It should be understood that the scope of the present disclosure is not limited to a certain type of compressive imaging, and other compressive imaging techniques may be used.

In one embodiment, a radar device is positioned behind a visible light mirror (e.g., visible light mirror 102). The radar signals generated by the radar device may be transmitted and received through the mirror, thereby allowing imaging module 416 to generate a radar image based on the signals. In one embodiment, the visible light mirror includes a film metallic reflector. The film may be continuous (i.e. no separations for the length and width of the reflector) and may be of a thickness that is less than the skin depth of the radar signal being generated by the radar device. In this manner, the visible light mirror is visually reflective, but allows the transmission of many frequencies of millimeter wave signals. In another embodiment, the visible light mirror includes a reflector that comprises an array of disconnected metallic areas. The areas are each of a length and width that are large as compared to wavelengths associated with visible light, and small as compared to wavelengths associated with radar signals. The spacing between areas of the array is configured to be small enough so as to be visually unresolvable by a viewer. The size of the spacing utilized may be based on an estimated average location of a viewer. For example, the spacing used for a first configuration where the viewer is expected to be 5 meters from the mirror may be larger than the spacing used for a second configuration where the viewer is expected to be 2 meters from the mirror. The scope of the present disclosure is not limited to a certain expected viewer distance. In another embodiment, the visible light mirror may include a multilayer dielectric reflector. Based on the type and thickness of the dielectric layers, a specified reflectivity of visible light may be produced, while still allowing the transmission of radar signals.

The radar device may include various types of radar antennas. In one embodiment, the radar device includes a non-moving flat panel radar antenna. For example, the flat panel radar antenna may be a phased array antenna. The phased array generally includes an array of multiple antennas in which the phases of the signals from the antennas are varied such that the effective radiation pattern of the entire array is focused in a certain direction and suppressed in an undesired direction. As another example, the flat panel radar device may include a metamaterial surface antenna (e.g., an MSAT-type radar).

In one embodiment, the radar device includes a physically moving antenna. The physically moving antenna may rotate, pan, and/or tilt as the radar device is scanning (transmitting and receiving radar signals). For example, the physically moving antenna may be a rectangular antenna, a dish, or other parabolic antenna (e.g., an "orange-peel" type) that is configured to rotate about a central axis. The rate and direction of rotation may be controlled by imaging module 416 and may be based on settings stored in configuration data 412.

In one embodiment, a radar device is positioned behind an OLED display (e.g., OLED display 202). The radar device may include a flat panel radar antenna, which may be entirely behind the OLED display (e.g., behind the back panel of the display) or may be embedded/integrated into the OLED display (e.g., behind the screen of the display but in front of a back panel. In an alternative embodiment, the flat panel antenna of the radar device may be embedded/integrated into the bezel of the OLED display. In general, the radar device may image though the OLED display as the organic components of the display are transmissive to millimeter wavelength signals. In one embodiment, the flat panel antenna is a phased array antenna. In another embodiment, the flat panel antenna is a metamaterial surface antenna (e.g., an MSAT-type radar). In another embodiment, the radar device includes a movable antenna.

In one embodiment, the OLED display is configured to display an advertisement in order to capture the gaze of a viewer. Alternatively, the OLED display may display entertainment programming, news programming, a map, and the like. In one embodiment, the OLED display is a computer monitor that is communicably coupled to a computing system. In another embodiment the OLED display is a television. Images displayed by the OLED display may be static or dynamic. Further, images displayed by the OLED display may be based on the presence or gaze of a viewer. For example, the system or the OLED display can include components configured to detect the presence of a viewer (e.g., proximity sensors, infrared sensors, ultrasonic sensors, microwave sensors, a camera, the radar, etc.). The viewer detection components may also detect the eyes and gaze of a viewer. In this manner, the OLED display may be reactive to a viewer and display certain content in an attempt to retain the gaze of a viewer so that the viewer can be imaged by the radar device and imaging module 416 as the viewer is looking towards the display. Although OLED displays are discussed herein, it should be understood that other types of displays (e.g., LED, LCD, e-Ink, etc.) may also be used to implement the display (e.g., display 202) if the display is constructed using components that are transmissive to millimeter wavelength signals such that the radar device may image though the display as disclosed.

In one embodiment, a radar device is positioned behind a static picture display (e.g., picture display 302) that is configured to display an advertisement. For example, the static picture display may be a poster, a billboard, a sign, and the like. The radar device may include a flat panel radar antenna that can image through the static picture display. In one embodiment, the flat panel antenna is a phased array antenna. In another embodiment, the flat panel antenna is a metamaterial surface antenna (e.g., an MSAT-type radar). In another embodiment, the radar device includes a movable antenna.

Figure 5:
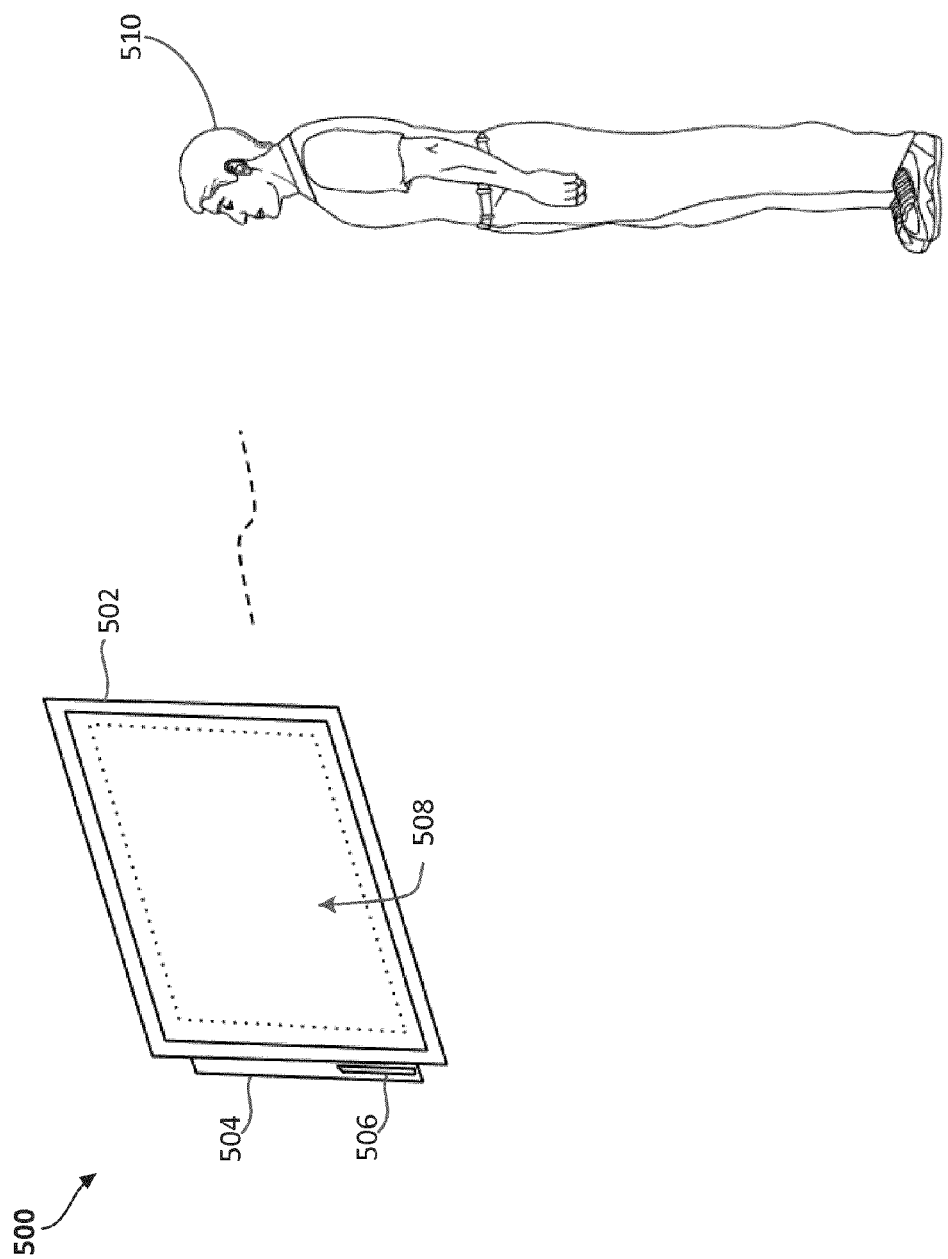
FIG. 5 is a schematic diagram of a system for concealed radar imaging according to one embodiment.

Referring to FIG. 5, a schematic diagram of concealed radar imaging system 500 is shown according to one embodiment. System 500 includes display 502, radar device 504, and processing circuit 506. Display 502 may be any of the types of displays discussed herein. For example, display 502 may be a visible light mirror with a film reflector (area 508). As another example, display 502 may be an OLED television with an OLED display area (area 508). The OLED television may display static or dynamic content (e.g., advertisements). As another example, display 502 may be a static picture display that depicts an advertisement on its surface (area 508). Radar device 504 is a flat-panel radar device that is positioned behind display 502. For example, radar device 504 may be coupled to the back of display 502. As another example, radar device 504 may be positioned in a compartment within a wall or structure to which display 502 is mounted. Processing circuit is communicably coupled to radar device 504 and causes radar device to emit a radar signal through display 502. The radar signal may reflect off of viewer 510, and reflections of the signal may be received through the display by radar device 504. Processing circuit may analyze the radar signals to generate a radar image as described above.

Figure 6:
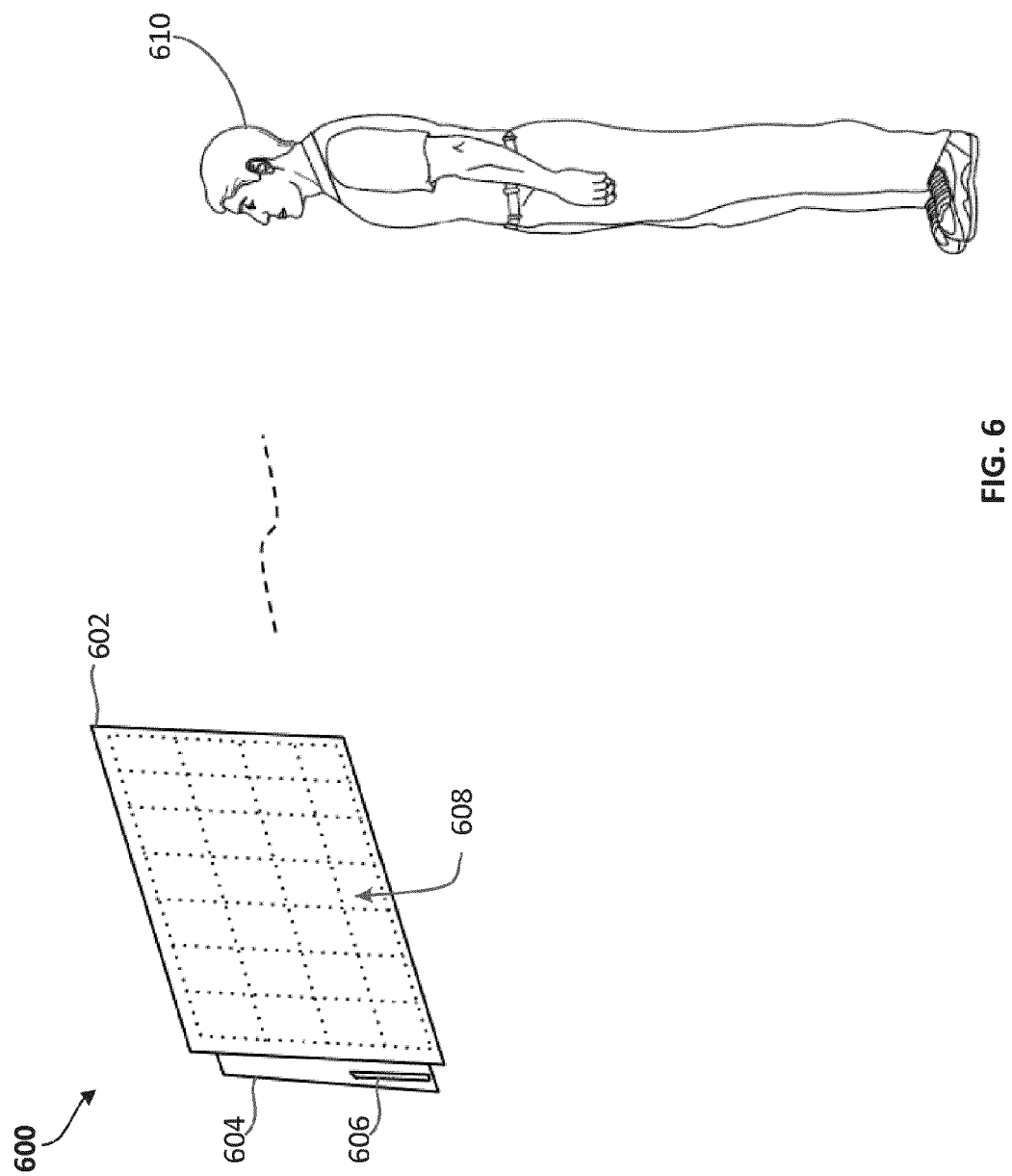
FIG. 6 is a schematic diagram of a system for concealed radar imaging according to one embodiment.

Referring to FIG. 6, a schematic diagram of concealed radar imaging system 600 is shown according to one embodiment. System 600 includes visible light mirror 602, radar device 604, and processing circuit 606. Visible light mirror 602 is depicted as having reflector 608 that is formed from an array of disconnected metallic areas. It should be noted, that the scale, dimensions, and positioning of the disconnected areas are for illustrative purposes and are in no way limiting. The spacing between the areas is configured to be small enough such that viewer 610 is unable to resolve the spacing. Radar device 604 is a flat-panel radar device that is positioned behind visible light mirror 602. For example, radar device 604 may be coupled to the back of visible light mirror 602. As another example, radar device 604 may be positioned in a compartment within a wall/structure to which visible light mirror 602 is mounted. Processing circuit is communicably coupled to radar device 604 and causes radar device to emit a radar signal through visible light mirror 602. The radar signal may reflect off of viewer 610, and reflections of the signal may be received through the display by radar device 604. Processing circuit may analyze the radar signals to generate a radar image as described above.

Figure 7:
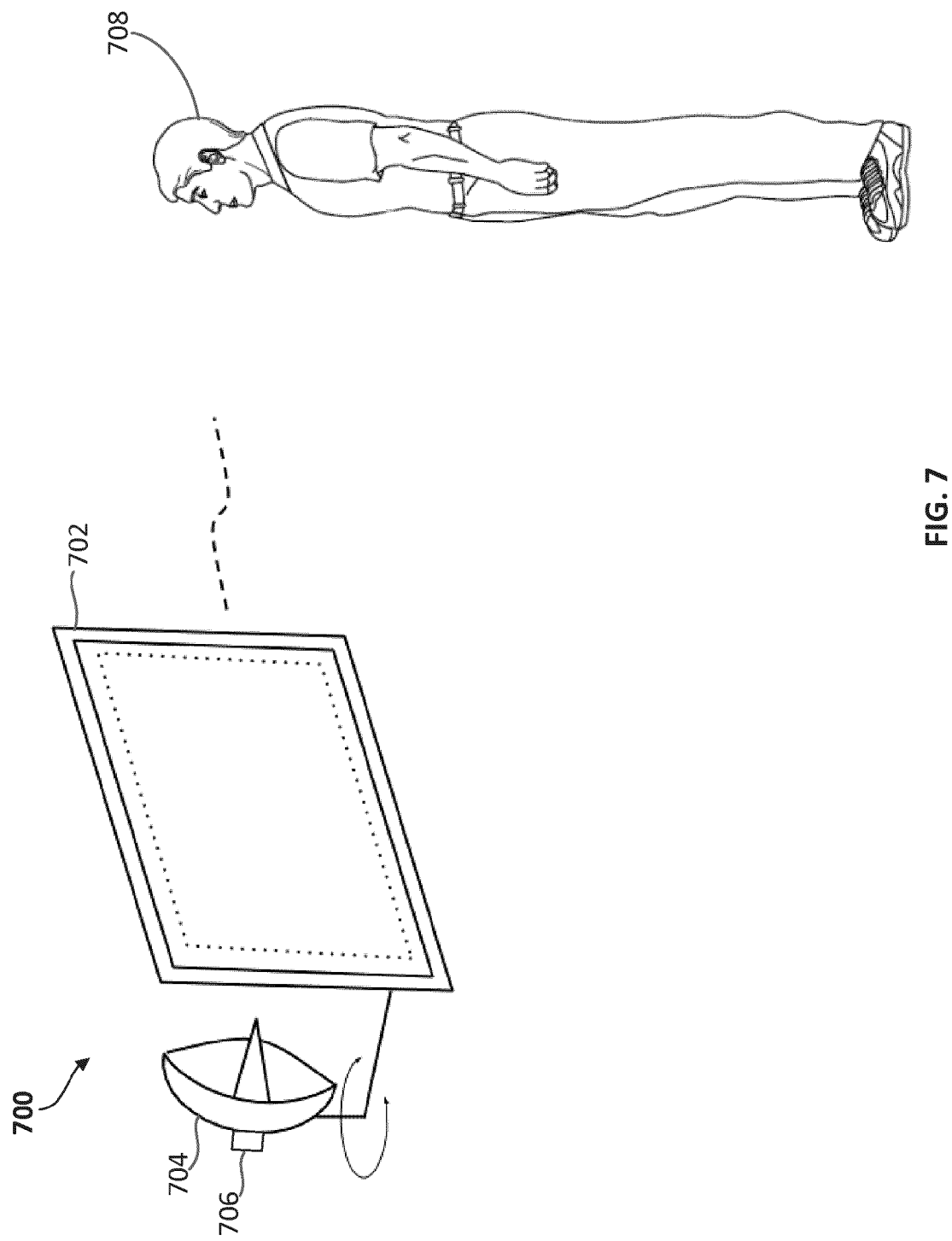
FIG. 7 is a schematic diagram of a system for concealed radar imaging according to one embodiment.

Referring to FIG. 7, a schematic diagram of concealed radar imaging system 700 is shown according to one embodiment. System 700 includes display 702, radar device 704, and processing circuit 706. Display 702 may be any of the types of displays discussed herein. For example, display 702 may be a visible light mirror with a continuous film reflector or an array of reflective areas. As another example, display 702 may be an OLED television with an OLED display. As another example, display 702 may be a static picture display. Radar device 704 has a physically moving antenna, and is positioned behind display 702. For example radar device 704 may include a moving dish, parabolic, "orange-peel," or flat antenna that is capable of movement. Radar device 704 may rotate, pan, or tilt in a direction as controlled by processing circuit 706. For example, the movement of the antenna may be based on a certain scanning pattern or compressive imaging algorithm being utilized. Processing circuit is communicably coupled to radar device 704 and causes radar device to emit a radar signal through display 702. The radar signal may reflect off of viewer 708, and reflections of the signal may be received through the display by radar device 704. Processing circuit may analyze the radar signals to generate a radar image as described above.

Figure 8:
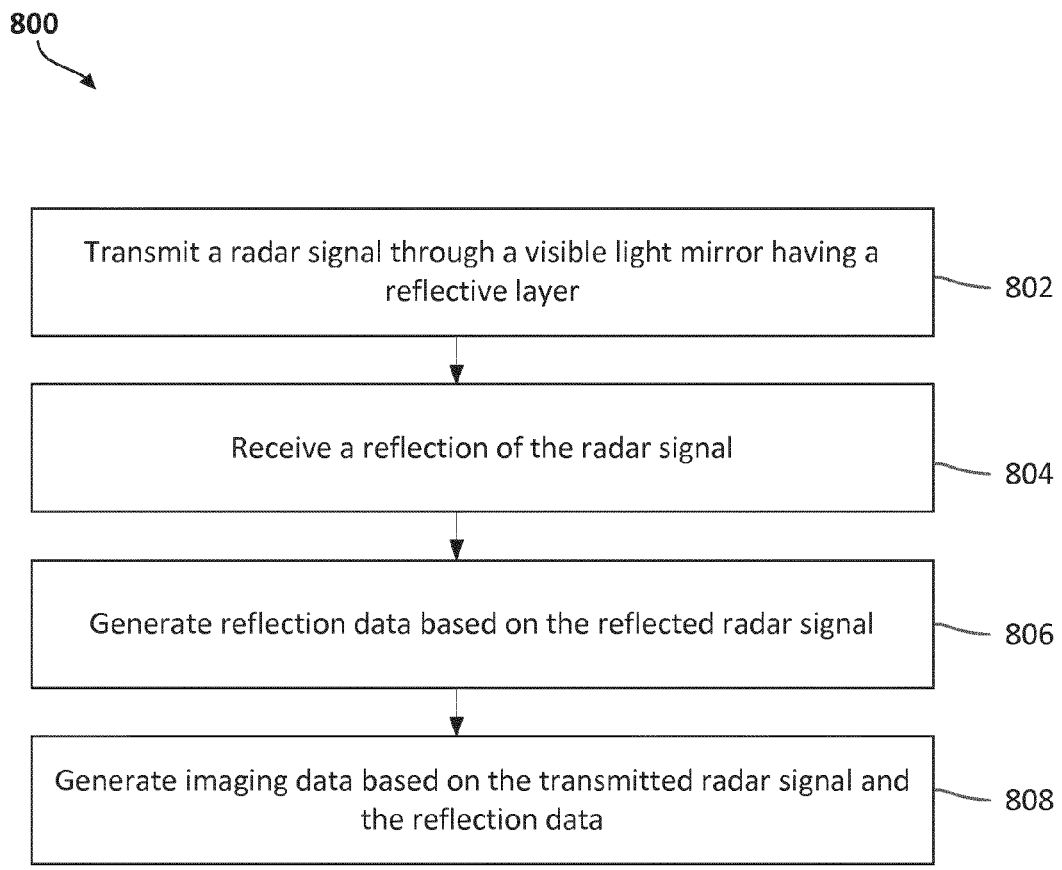
FIG. 8 is a flowchart of a process for concealed radar imaging according to one embodiment.

Referring to FIG. 8, a flow diagram of a process 800 for concealed radar imaging is shown, according to one embodiment. In alternative embodiments, fewer, additional, and/or different actions may be performed. Also, the use of a flow diagram is not meant to be limiting with respect to the order of actions performed. A radar device that is positioned behind a visible light mirror transmits a radar signal through the visible light mirror (802). The visible light mirror may have a reflective layer that is a continuous metallic film, an array of disconnected metallic areas, or a multilayer dielectric reflector. The radar signals may reflect and backscatter off of an object (e.g., a viewer), and the reflections are received by the radar device (804). Based on the reflected radar signals, reflection data is generated (806). The reflection data and data related to the transmitted radar signals (e.g., transmission strengths, direction, wavelength, frequency, timing information, etc.) are used by an imaging algorithm to generate radar imaging data (808).

Figure 9:
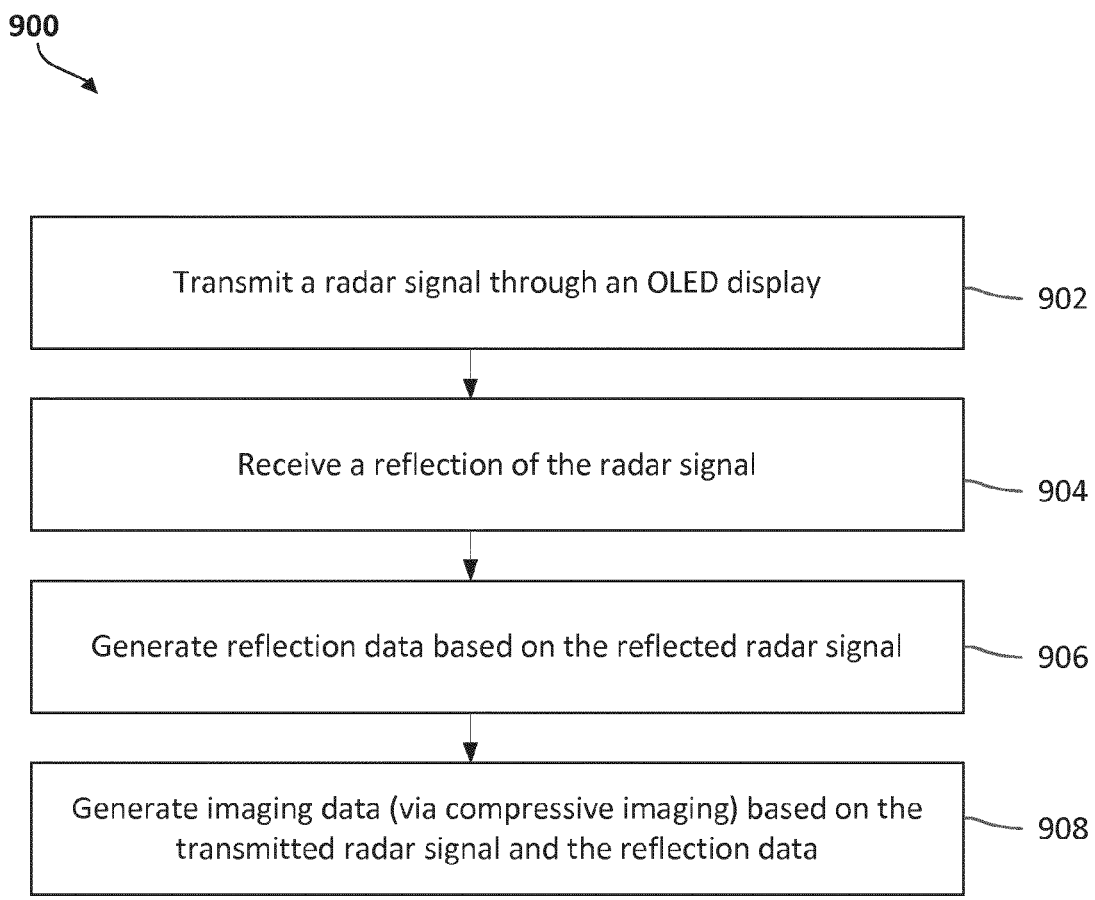
FIG. 9 is a flowchart of a process for concealed radar imaging according to one embodiment.

Referring to FIG. 9, a flow diagram of a process 900 for concealed radar imaging is shown, according to one embodiment. In alternative embodiments, fewer, additional, and/or different actions may be performed. Also, the use of a flow diagram is not meant to be limiting with respect to the order of actions performed. A radar device that is positioned behind an OLED display transmits a radar signal through the OLED display (902). The OLED display may be part of a television, or computer monitor, etc., and may display an advertisement. The radar signals may reflect and backscatter off of an object (e.g., a viewer), and the reflections are received by the radar device (904). Based on the reflected radar signals, reflection data is generated (906). The reflection data and data related to the transmitted radar signals (e.g., transmission strengths, direction, wavelength, frequency, timing information, etc.) are used by a compressive imaging algorithm to generate radar imaging data (908).

Figure 10:
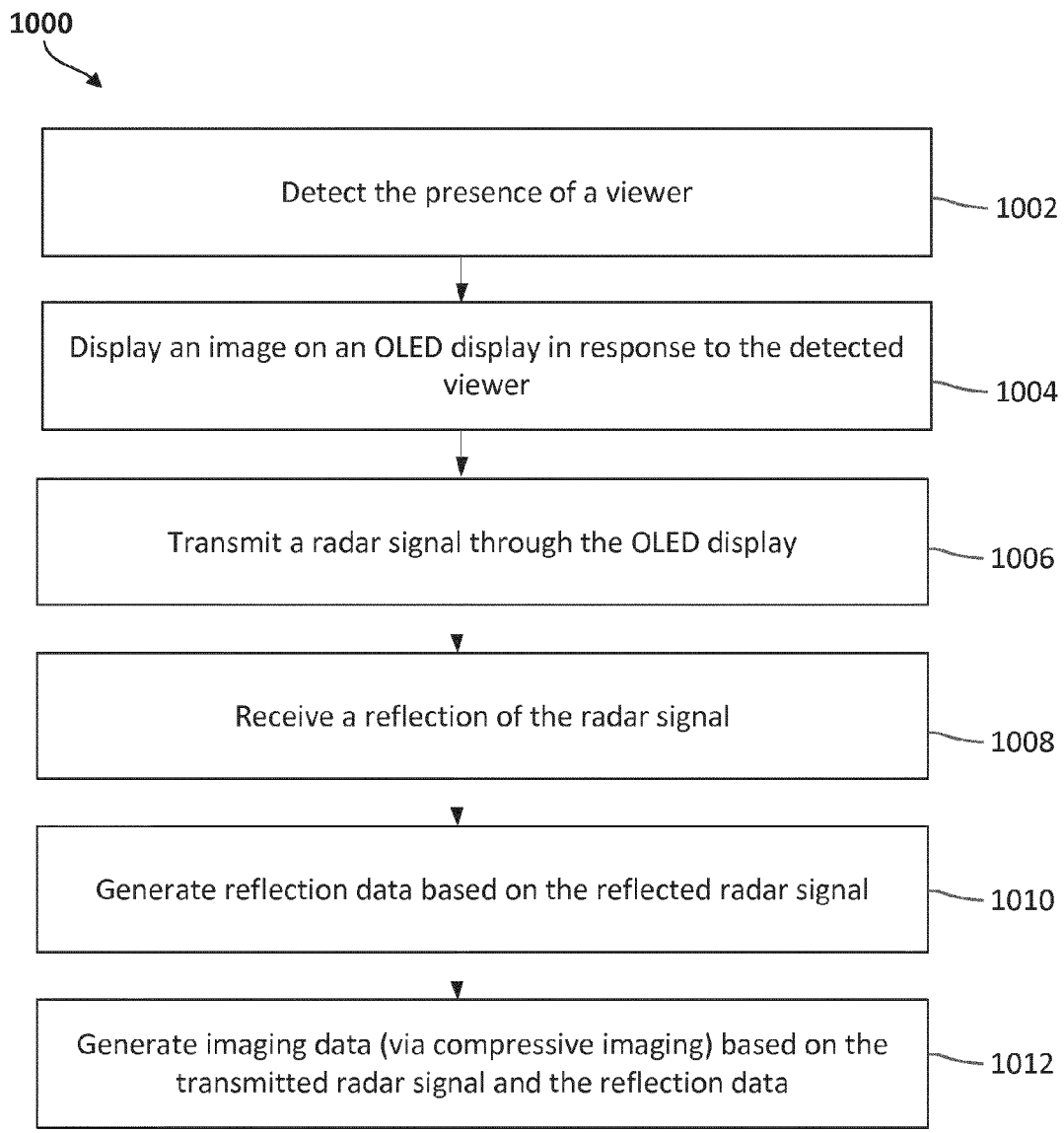
FIG. 10 is a flowchart of a process for concealed radar imaging according to one embodiment.

Referring to FIG. 10, a flow diagram of a process 1000 for concealed radar imaging is shown, according to one embodiment. In alternative embodiments, fewer, additional, and/or different actions may be performed. Also, the use of a flow diagram is not meant to be limiting with respect to the order of actions performed. An OLED display includes a viewer detection system. The viewer detection system can detect the presence of a viewer (e.g., using a proximity sensor, a radar, or a camera, etc.). In response to a detected viewer, the OLED display may display a particular advertisement or image. A radar device that is positioned behind the OLED display transmits a radar signal through the OLED display (1006). The OLED display may be part of a television, or computer monitor, etc. The radar signals may reflect and backscatter off of an object (e.g., a viewer), and the reflections are received by the radar device (1008). Based on the reflected radar signals, reflection data is generated (1010). The reflection data and data related to the transmitted radar signals (e.g., transmission strengths, direction, wavelength, frequency, timing information, etc.) are used by a compressive imaging algorithm to generate radar imaging data (1012).

Figure 11:
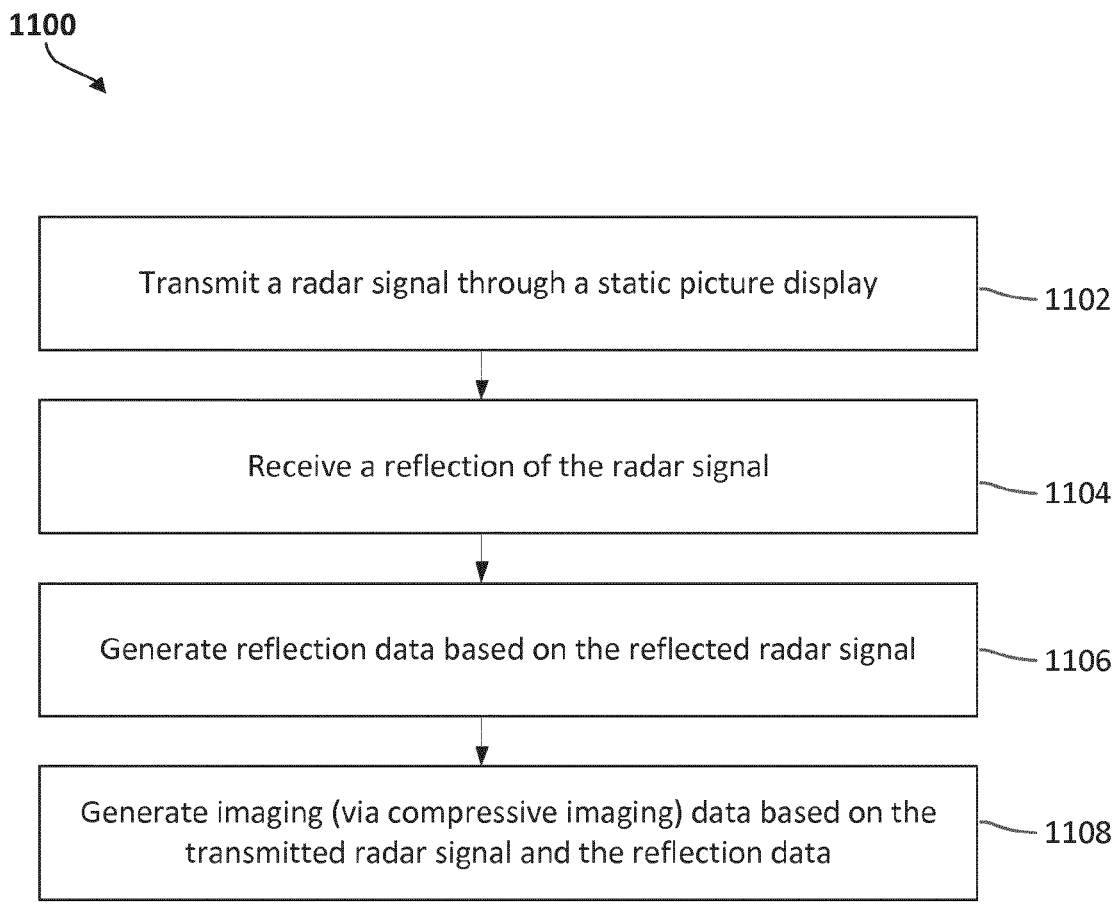
FIG. 11 is a flowchart of a process for concealed radar imaging according to one embodiment.

Referring to FIG. 11, a flow diagram of a process 1100 for concealed radar imaging is shown, according to one embodiment. In alternative embodiments, fewer, additional, and/or different actions may be performed. Also, the use of a flow diagram is not meant to be limiting with respect to the order of actions performed. A flat panel radar device that is positioned behind a static picture display (e.g., a sign, a billboard, a poster, etc.) transmits a radar signal through the static picture display (1102). The static picture display may display an advertisement. For example, the static picture display may be a sign that is hung on the wall in an airport or other public area. The radar signals may reflect and backscatter off of an object (e.g., a viewer), and the reflections are received by the radar device (1104). Based on the reflected radar signals, reflection data is generated (1106). The reflection data and data related to the transmitted radar signals (e.g., transmission strengths, direction, wavelength, frequency, timing information, etc.) are used by a compressive imaging algorithm to generate radar imaging data (1108).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A concealed radar imaging system, comprising:
   an OLED display comprising an electroluminescent layer of an organic compound, wherein the electroluminescent layer is configured to:
      emit light to display an image; and
      allow a radar signal to pass therethrough;
   a radar device positioned behind the OLED display, wherein the radar device is configured to:
      transmit the radar signal;
      receive a reflection of the radar signal; and
      generate reflection data based on the reflected radar signal; and
   a processing circuit coupled to the radar device, wherein the processing circuit is configured to:
      control operation of the radar device;
      receive the reflection data from the radar device; and
      generate imaging data based on the transmitted radar signal and the reflection data.

2. The system of claim 1, wherein the radar signal is a millimeter wave signal.

3. The system of claim 1, wherein the radar device is a non-moving flat panel radar device.

4. The system of claim 3, wherein the flat panel radar device is coupled to the OLED display.

5. The system of claim 3, wherein the flat panel radar device includes a phased array of antennas.

6. The system of claim 3, wherein the flat panel radar device includes a metamaterial surface antenna.

7. The system of claim 1, wherein the radar device is a physically moving radar scanning device.

8. The system of claim 1, wherein the processing circuit is configured to control the operation of the radar device to facilitate compressive imaging, and wherein generating the imaging data is based on a compressive imaging algorithm.

9. The system of claim 1, wherein the displayed image includes at least one of an advertisement, entertainment programming, a map, and news programming.

10. The system of claim 1, wherein the displayed image is one of a plurality of images in a video image sequence.

11. The system of claim 1, further comprising a sensor configured to detect a presence of a viewer, and wherein the image is displayed in response to the detected viewer.

12. The system of claim 11, wherein the sensor includes an infrared sensor.

13. The system of claim 11, wherein the sensor includes an ultrasonic sensor.

14. The system of claim 11, wherein the sensor includes a microwave sensor.

15. The system of claim 11, wherein the sensor includes a camera.

16. The system of claim 1, wherein the processing circuit is further configured to detect a presence of a viewer based on the reflection data, and wherein the image is displayed in response to the detected viewer.

\* \* \* \* \*